United States Patent [19]
Cheng et al.

[11] Patent Number: 6,159,721
[45] Date of Patent: *Dec. 12, 2000

[54] AMINE MODIFIED POLYSACCHARIDES

[75] Inventors: Huai Nan Cheng; Qu-Ming Gu, both of Wilmington; Robert G. Nickol, Hockessin, all of Del.

[73] Assignee: Hercules Incorporated, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/919,190

[22] Filed: Aug. 20, 1997

[51] Int. Cl.[7] .............................. C12N 9/50; C08B 37/06
[52] U.S. Cl. ............................................................... 435/219
[58] Field of Search ........................... 536/2, 123, 123.1; 435/219, 212, 213, 214, 215, 216, 217, 188, 218

[56] References Cited

U.S. PATENT DOCUMENTS

| | | | |
|---|---|---|---|
| 2,480,710 | 8/1949 | Bryant | 260/209.5 |
| 2,520,123 | 8/1950 | Carson | 536/2 |
| 3,455,783 | 7/1969 | Alburn et al. | 195/29 |
| 3,835,111 | 9/1974 | Ehrlich et al. | 260/109.5 |
| 4,065,614 | 12/1977 | Nelson | 536/2 |
| 4,095,000 | 6/1978 | Brenner | 426/656 |
| 4,683,298 | 7/1987 | Yalpani | 536/45 |
| 4,952,684 | 8/1990 | Yalpani et al. | 536/18.7 |
| 4,959,461 | 9/1990 | Yalpani et al. | 536/18.7 |
| 4,963,664 | 10/1990 | Yalpani et al. | 536/18.7 |

FOREIGN PATENT DOCUMENTS

| | | | |
|---|---|---|---|
| 121960 | 10/1984 | European Pat. Off. | C12P 19/14 |
| 124439 | 11/1984 | European Pat. Off. | C12P 19/04 |
| 192401 | 8/1986 | European Pat. Off. | C12N 9/40 |
| 574066 | 12/1993 | European Pat. Off. | C12P 19/04 |
| 4013741 | 1/1992 | Japan . | |
| 9213741 | 1/1992 | Japan . | |
| 1620444 | 9/1988 | Russian Federation | C08B 37/06 |
| WO 89/12648 | 12/1989 | WIPO | C08B 37/06 |

OTHER PUBLICATIONS

The Merck Index, 11th Edition, 1989, p. 1118.
Chemical Abstracts, vol. 104, No. 12, 1986; abstract No. 90879m, p. 132; column 1; XP002087293.
Yalpani, Manssur, Developments and prospects in enzymatic biopolymer modifications, Prog. Biotechnol. Date: 1987, vol. 3, No. Ind. Polysaccharides, pp. 7–34.
Gacesa, Peter, Enzymic modification of polysaccharides, Chim. Oggi, No. 4, pp. 23–7, 1988.
Yalpani, Manssur, A survey of recent advances in selective chemical and enzymic polysaccharide modifications, Tetrahedron, vol. 41, No. 15, pp. 2957–3020, 1985.
McCleary, Barry V., Enzymic modification of plant polysaccharides, Int. J. Biol. Macromol. 1986, vol. 8, No. 6, pp. 349–354.
Mahoney, R. R.; Farrell, C.; Wetherby, A.M., Interaction of Lysine with Pectin, Food Industry, vol. 9 No. 4, pp. 289–294, 1982.
Bystricky, S.; Malovikova, A.; Sticzay, T., Carbohydrate Polymers, 1990, 13:283–294.
Jakubke et al, Angew. Chem. Int. Ed. Engl. 24(2):85–93, 1985.

*Primary Examiner*—Francisco Prats
*Attorney, Agent, or Firm*—Ivan G. Szanto; Robert O'Flynn O'Brien

[57] ABSTRACT

Amine modified pectins wherein the amine is a water soluble amine, amino acid, etc. and process to catalyze the reaction of water soluble polymers having alkoxyester and carboxylic acid functionality, such as polysaccharides, with a primary or secondary amine in the presence of a protease and water.

11 Claims, 1 Drawing Sheet

AMINE MODIFIED POLYSACCHARIDES

BACKGROUND OF THE INVENTION

1. Field of Invention

The present invention relates to amine modified polysaccharides and more particularly it relates to solutions and gels of amino acid-modified pectins formed by enzyme-catalyzed reactions.

2. Description of the Prior Art

Pectin is a highly branched complex polysaccharide that is commonly used in food formulations. Structurally, it consists of D-galacturonic acid residues linked together through α-1,4-glycosidic bonds and interrupted by rhamnose residues. Additional sugar branches are substituted at the rhamnose. The extent and distribution of substitution depend upon the source of the pectin and on the method of isolation. The polygalacturonic acid is partly methoxylated at the C-6 positions and free acid groups may be partly or fully neutralized with sodium, potassium, or ammonium ions The pectin obtained by the manufacturing process is high ester pectin.

It is known that many factors such as molecular weight, the non-uronide content, and methoxy content may influence gelation properties of pectin. It is also known that one of the most important properties of acidic polysaccharides is the ability to interact with positively charged counterions. Thus, sodium, potassium, calcium and magnesium have significant effect on the gelation of pectin. A large amount of calcium ions can render pectin completely insoluble (R. L. Whistler, J. N. BeMiller, Industrial Gums, 3rd Ed., Academic Press, New York, 1991).

Pectins can interact with lysine (Mahoney, R. R.; Farrell, C; Wetherby, A. M., Food Chem. 1982, 9: 289–294) as well as the basic polypeptides, namely, poly(L-lysine) and poly (L-lysine-alanine-alanine) (Bystricky, S.; Malovikova, A.; Sticzay, T, Carbohydrate Polymers, 1990, 13: 283–294). It has also been reported that pectin interacts with polylysine to form polyelectrolyte complexes (Japanese Patent: JP 9213741 A2 and JP 0413741). However, the complex formed is not stable and does not cause significant change in the properties of pectin in terms of viscosity and gelling ability.

Gelation and viscosity are highly desirable properties; however, commercial pectin, as is, usually shows relatively low viscosities.

SUMMARY OF THE INVENTION

According to the present invention there is provided a process comprising contacting a water soluble polymer having alkoxyester and carboxylic acid functionality with a primary or secondary amine in the presence of a protease and water.

In another aspect, the present invention provides a gel of amino acid-pectin formed by such a method.

According to the present invention there are provided compositions of modified pectins wherein the pectin is modified with certain amino acids.

DETAILED DESCRIPTION OF THE INVENTION

Figure 1:
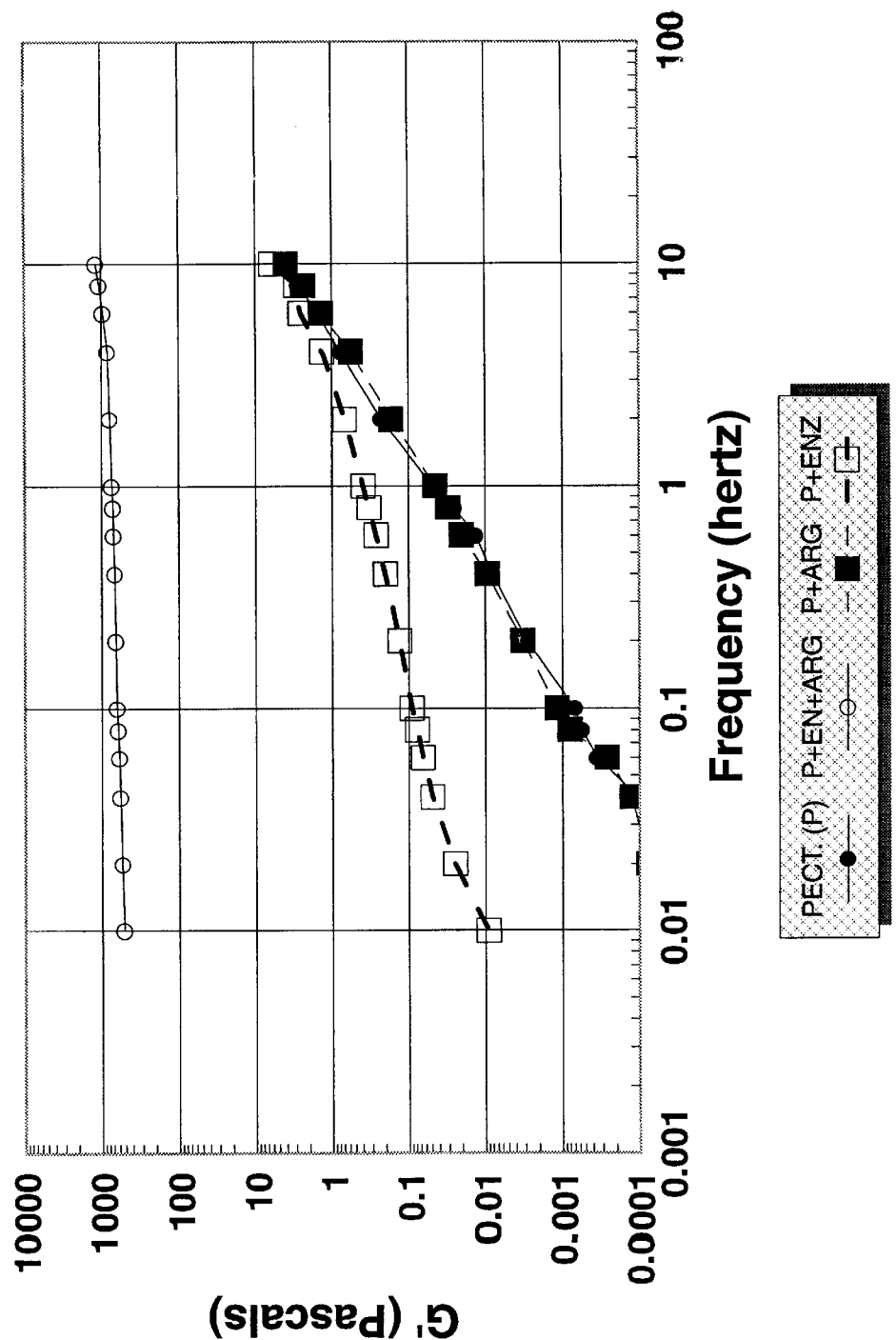
FIG. 1 shows the elastic modulus of the gels as a function of stress rheometer frequency.

It has been discovered that amines and amino acids react with the alkoxy groups of water soluble polymers having alkoxy and carboxylic acid functionality, e.g., pectin, through the catalysis of a suitable enzyme, e.g., a protease at room temperature. The resulting composition can form a strong gel in water, and the strength of the gel may depend upon the degree of derivatization. The gelling ability and the degree of derivatization may be controlled by changing the type of pectin and its concentration in the reaction mixture, the reaction temperature, the reaction time, and the pectin/amino acid ratio and pectin/enzyme ratio. The reaction is fast and in most cases a gel can be obtained in 30–60 minutes. It has also been found that under the same reaction conditions the strength of amino acid-pectin gel decreases as the methoxy group content of the starting pectin (degree of esterification) decreases. It has also been found that high methoxy pectin formed a firm gel and low methoxy pectin formed a soft gel with this reaction. Pectin that contains less than 2% methoxy group and amidated pectin did not form a gel under the same conditions.

We have also found that this unique gelling property of amino acid-pectin can be used to make sucrose/pectin gel or calcium/pectin gels with much less pectin material as compared to untreated pectin. In both sucrose/pectin or calcium/pectin cases, the gels can be made by the addition of previously isolated amino acid-pectin, or made by directly adding high methoxy pectin, an appropriate amino acid, and papaya latex papain or an equivalent enzyme.

Any water-soluble polymer having an alkoxy ester and carboxylic acid functionality can be used in the present invention. Preferably polysaccharides are used and more preferably polysaccharides such as pectin, pectinate, pectate and pectin fragment and alkyl ester of polygalacturonic acid. The most preferred polysaccharides are high methoxy citrus pectin.

Amines useful in the present invention can be water-soluble or water-insoluble. Water soluble amines can be selected from the group consisting of monoamines, diamines, triamines, polyamines, peptides, dipeptides, tripeptides, enzymes, amino acids, proteins, hydrolyzed proteins, degraded proteins and denatured proteins. Preferably the water-soluble amine is an amino acid and most preferably it is lysine, arginine, alanine, hydrolyzed protein, or mixtures thereof.

Proteases may be used in the process of the present invention. Papain and trypsin are preferred and papaya latex papain and bovine pancreas trypsin are more preferred.

Particularly useful, readily gellable, modified pectins can be prepared by the interaction of pectin and amino acids or certain amines in the presence of a protease such as papain or trypsin. These reactions can be depicted by the following formulas.

I

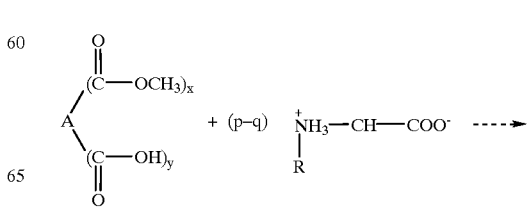

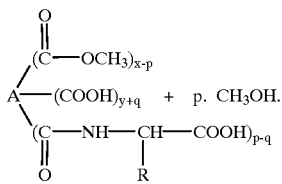

where A is the residue after the —COOCH$_3$ and —COOH groups have been removed from pectin.

Moreover, x, y, p, q are in mole fractions, and x=0.02 to 1.00, y=1−x, p=0 to x, q=0 to p R is (CH$_2$)$_4$NH$_2$, residue after NH$_2$CHCOOH has been removed from lysine, (CH$_2$)$_3$NHC(NH$_2$)=NH, residue after NH$_2$CHCOOH has been removed from arginine, or CH$_3$, residue after NH$_2$CHCOOH has been removed from alanine.

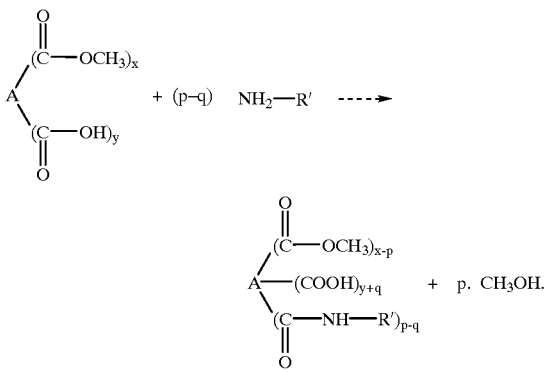

wherein R' is

—CH$_2$—(CH$_2$)$_5$—NH$_2$

—CH$_2$—CH$_2$—NH—CH$_2$—CH$_2$—NH$_2$

—CH$_2$—CH$_2$—CH$_2$-imidazole

—CH(CH$_3$)—CH$_2$—[O—CH(CH$_3$)—CH$_2$]$_i$—(O—CH$_2$—CH$_2$)$_j$—[O—CH$_2$—CH(CH$_3$)]$_k$—NH$_2$, (and the sum of i, j, and k is from 3 to 12).

In order to make an amino acid modified pectin gel, a methoxy containing pectin preferably a high methoxy pectin, is dissolved in water, preferably deionized water. The concentration of pectin can range from about 0.1 to about 25% by weight, preferably from about 0.5 to about 10% and most preferably from about 1 to about 3% based on the total weight of the solution. The methoxy content of the pectin can range from about 2 to about 100%, preferably from about 20 to about 100% and most preferably from about 65 to about 90%. The weight average molecular weight of the pectin is generally from about 8,000 to about 1,000,000, preferably from about 15,000 to about 500,000, and preferably from about 25,000 to about 150,000. As the most preferred enzyme, papaya latex papain is used.

The concentration of amino acids and papaya latex papain in the reaction mixture can range from about 0.01 to about 25% by weight, preferably from about 0.05 to about 10% and most preferably from about 0.1 to about 2%, depending on the concentration of pectin.

The concentration of polysaccharide and amino acid and protease in the reaction mixture can range from about 0.02 to about 50% by weight, preferably from about 0.5 to about 20% and most preferably from about 1 to about 5%.

The ratio of pectin to papain is from about 50:1 to about 1:2, preferably from about 10:1 to about 1:1 and most preferably from about 5:1 to about 2:1. Gelation is facilitated at higher papain levels because papain can serve as a water soluble amine. The ratio of papain to amino acid acid can be from about 0.1:1 to about 1:4, preferably from about 0.5:1 to about 2:1 and most preferably about 1:1. It has been found that the higher the ratio of enzyme and amino acid to pectin, the stronger is the gel formed. When the concentration of pectin is higher than 3%, a firm gel can be obtained at a low ratio of enzyme and amino acid to pectin, for example at about 1:10.

The enzymatic reaction can be carried out at temperatures from about 0° C. to about 80° C., preferably from about 18° C. to about 37° C. and most preferably at about 20–25° C. The gelation is fast and in some instances can be complete in as little time as 5 minutes when the pectin concentration is high and the ratio of papain-amino acid to pectin is in the range of 1/5 to 1/4 or higher. In most cases it takes about 30 minutes to form the amino acid modified pectin gel but in some instances the reaction can be carried on for as long as 48 hours.

We observed that pectin modified with the basic amino acids, e.g., lysine and arginine, produced enhanced gelling properties. The arginine-modified pectin produces the strongest gel among all the amino acid-modified pectins. The alanine-pectin also forms a gel, but it is very soft. Threonine, serine, cysteine, aspartic acid, glutamic acid, and all three aromatic amino acids showed no gel formation but showed slight increases in viscosities.

The amino acid-modified pectin can be isolated by precipitating it with isopropanol and then drying it. IR analysis has shown that an intense "amide II" band appeared at 1530 cm-1 which was not observed in the separate IR spectra for pectin and the amino acid. Reverse phase HPLC analysis of untreated pectin and lysine-modified pectins indicated that the various species have different retention times. The modified pectin was washed extensively with isopropanol and dialyzed against pH 4.0 buffer overnight. It was then freeze dried. The $^{13}$C-NMR analysis suggested that some lysine had been grafted on the pectin by the formation of amide bonds. The gel strength of the purified amino acid-pectin in deionized water is not as strong as (but close to) the unpurified, original gel, and both are much higher than the simple mixtures of pectin/amino acids or pectin/enzyme in terms of viscosity.

Both lysine-modified pectin and arginine-modified pectin exhibited considerable enhancement in gel strength. The gel is formed at about 0.2–0.5% concentration in water with or without treatment with calcium chloride. Suitable pH range for the formation of amino acid-modified pectin gels is from about 4 to about 11, preferably from about 5 to about 9 and most preferably from about 7.5 to about 8. Without Ca and other additives, the arginine-modified pectin gives a gel that is approximately 5–10 times stronger than the gel from pectin alone. As calcium/pectin gels, arginine- and lysine-modified pectins are approximately 2–3 times stronger than pectin/calcium alone. As pectin-sucrose-citric acid gels, arginine-modified pectin is about twice as strong as pectin-sucrose-citric acid alone.

These amino acid-modified pectin derivatives may be used as more efficient gelling agents in some pectin applications. For example, they can replace conventional pectin in applications where enhanced gel strength is desirable. The amino acid-modified pectin can also be used in cosmetic formulations and in drug delivery systems.

The present invention is illustrated in the following examples, wherein all parts are by weight unless otherwise indicated. These examples are given merely by way of illustration and are not intended to limit the invention as set forth in the claims.

EXAMPLE 1

This example illustrates a typical preparation of L-lysine-modified pectin.

1 g of pectin (from citrus fruits, labeled as grade 1, available from Sigma Chemical Company) was dissolved in 50 ml of deionized water. All pectins used in the Examples are unstandardized. 0.2 g of papaya latex papain (1.1 units/mg solid, available from Sigma Chemical Company) was dissolved in 4 ml of deionized water and then centrifuged using a microcentrifuge. In each of Examples 1–21 crude papaya latex papain were used. The pellet was discarded, and the supernatant and 0.2 g of L-lysine in 2 ml of deionized water were added to the pectin solution with stirring at room temperature. The mixture was stirred at 24° C. for 2 hrs to allow for reaction. The L-lysine-modified pectin gel was treated with two volumes of isopropanol (100 ml), and the precipitates were washed three times with isopropanol (2×100 ml). The product was suspended in 50 ml of water and then freeze-dried to give 1.02 g of lysine-modified pectin as a grey powder. IR analysis showed 1650 $cm^{-1}$ (overlapped with $CO_2H$ group); 1530 $cm^{-1}$ (amide II band); 1280 $cm^{-1}$ (amide III band).

Reverse phase HPLC (Whatman C1 EQC column, 4.6× 100 mm; isocratic elution with 0.1% trifluoroacetic acid; flow rate: 1 ml per minute) was used for the analysis. The untreated pectin and the lysine-modified pectin appeared at different retention times in the HPLC profile, and peak area integration indicated that 95% of original pectin had been modified.

The lysine-modified pectin was dialyzed against pH 4.0 buffer overnight and then freeze-dried. The $^{13}C$-NMR ($D_2O$, 10 mm tube) analysis further confirmed that some lysine had been grafted on the pectin by the formation of amides ($\delta=174.5$ ppm).

EXAMPLE 2

This example illustrates the typical preparation of L-arginine-modified pectin.

1 g of pectin (from citrus fruits, grade 1, Sigma Chemical Company grade 1) was dissolved in 50 ml of deionized water. To the pectin solution was added 0.2 g of L-arginine in 2 ml of deionized water and the pH was adjusted to 7.5 to 8.0 by the addition of concentrated HCl. 0.2 g of papaya latex papain (1.1 units/mg solid, Sigma Chemical Company) was dissolved in 4 ml of deionized water and then centrifuged using a microcentrifuge. The pellet was discarded and the supernatant was added to the pectin-arginine solution with stirring at room temperature. The mixture was stirred at 24° C. for 2 hrs and then allowed to react at 24° C. for 4–8 hrs. A gel was formed. The L-arginine-modified pectin gel was treated with two volumes of isopropanol (100 ml) and the precipitates were washed three times with isopropanol (3×100 ml). The product was redissolved in 100 ml of water and then freeze-dried to give 1.02 g of arginine-modified pectin as an off-white powder.

EXAMPLES 3–4 AND COMPARATIVE EXAMPLES A–K

The following reactions were carried out under the same experimental conditions as Examples 1 and 2. Various sources of pectins [GENU® HM Type pectin, amidated pectin (104AS YA), and GENU LM Type pectin (LM-2), all available from Hercules Incorporated, Copenhagen Pectin A/S, Lille Skensved, Denmark] were used for these examples.

| | Substances | Observed changes |
|---|---|---|
| Comparative Example A | HM pectin + arginine | liquid; viscosity decreased |
| Comparative Example B | HM pectin + papaya latex papain | liquid; viscosity increased |
| Example 3 | HM pectin + papaya latex papain, then arginine | gel formed in 30 minutes. |
| Comparative Example C | pectin amide + arginine + papaya latex papain | liquid |
| Comparative Example D | pectin amide + arginine | liquid; viscosity decreased |
| Comparative Example E | pectin amide + papaya latex papain | liquid |
| Comparative Example F | pectin amide + papaya latex papain, then arginine | liquid |
| Example 4 | LM pectin + arginine + papaya latex papain | liquid; viscosity increased slightly |
| Comparative Example G | LM pectin + arginine | liquid |
| Comparative Example H | LM pectin + papaya latex papain | liquid |
| Comparative Example I | HM pectin + arginine + pectinesterase | liquid; viscosity increased slightly |
| Comparative Example J | HM pectin + pectinesterase | liquid |
| Comparative Example K | HM pectin + pectinesterase, then several hour later arginine | liquid |

EXAMPLE 5

This example illustrates the effect of varying methoxy content of pectin on the gelation reaction.

To 2 ml of 2% pectin solution (HM Type, Hercules) was added 10 mg of L-arginine, and the pH was adjusted to 8.0 by the addition of 1 M HCl. 10 mg of papaya latex papain (from Sigma Chemical Company) in 50 µl of deionized water was added to the reaction solution. The components were mixed thoroughly by vortexing for 20 seconds at 24° C. and allowed to react at room temperature. A gel was formed after 20 minutes.

The gel character of the samples from Example 5 and Comparative Example A were measured by controlled stress rheometry. The experiments were performed at room temperature on a Bohlin CVO controlled stress rheometer over a frequency range of 0.01 to 20 hertz using 40 mm parallel plates with a strain input of 0.001 to 0.005. FIG. 1 is a plot of the elastic modulus of the sample (G', measured in Pascals) vs. the frequency (Hz, measured in Hertz, i.e., cycles/second). The pectin treated with papain and arginine (P+/EN+Arg) forms a strong gel as demonstrated by the magnitude of the elastic modulus and its relative insensitivity to frequency. The pectin and pectin+arginine combinations have more the character of viscoelastic liquids, i.e. the elastic moduli depend strongly on frequency. The pectin+ papain (P+ENZ) combination is an intermediate case with weak gel-like behavior.

EXAMPLE 6

This example illustrates the effects of the ratios of amino acid vs. papaya latex papain vs. pectin on the observed gelation properties and viscosity changes.

To 2 ml of 2% pectin solution (HM type from Hercules) was added 5 mg of L-arginine and 5 mg of crude papaya latex papain in 20 μl of deionized water. The mixture was vortexed for 1 minute at 24° C. and allowed to react at room temperature. A gel was formed after 3 hours.

To 2 ml of 2% pectin solution (HM type from Hercules) was added 40 mg of L-lysine and 20 mg of crude papaya latex papain in 100 μl of deionized water. The mixture was vortexed for 5 seconds at 24° C. and allowed to react at room temperature. A gel was observed after 10 minutes. The same result was obtained for the pectin purchased from Sigma Chemical Company (pectin grade 1). To 2 ml of 2% pectin solution (GENU BB slow set pectin, 4181–88 available from Hercules) was added 5 mg of L-arginine and 10 mg of crude papaya latex papain in 50 μl of deionized water. The mixture was vortexed for 1 minute at 24° C. A gel was formed after 40 minutes.

EXAMPLES 7–15

These Examples show the effect of different amino acids on the gelation characteristics.

To 2 ml of 2% pectin solution (from Sigma Chemical Company, grade 1) was added 15 mg of L-alanine and 15 mg of crude papaya latex papain in 50 μl of deionized water. These components were mixed by vortexing for 1 minute at 24° C. and allowed to react at room temperature. A soft gel was found after 16 hours. The same reaction conditions were used for the following examples.

|  | L-amino acids | Observed change |
|---|---|---|
| Example 7 | Glycine | liquid |
| Example 8 | Phenylalanine | liquid, cloudy, slightly increased viscosity. |
| Example 9 | Tyrosine | liquid, cloudy, slightly increased viscosity. |
| Example 10 | Tryptophan | liquid, cloudy. |
| Example 11 | Threonine | liquid |
| Example 12 | Serine | liquid |
| Example 13 | Cysteine | liquid, cloudy, slightly increased viscosity. |
| Example 14 | Aspartic acid | liquid |
| Example 15 | Glutamic acid | liquid |

EXAMPLES 16–18

The following examples illustrate the effect of pectin concentration on the gelation property. The experiments were performed under the same condition. GENU HM Type pectin from Hercules was used.

|  | Concentrations of the substances (w/w, %) | Observed change |
|---|---|---|
| Example 16 | pectin (2)/papaya latex papain (0.5)/arginine (0.5) | gel |
| Example 17 | pectin (1)/papaya latex papain (0.25)/arginine (0.25) | gel |
| Example 18 | pectin (0.5)/papaya latex papain (0.125)/arginine (0.125) | soft gel after 16 hours at room temperature |
| Comparative Example K | pectin (2)/papaya latex papain (0.5) | liquid; viscosity increases. |
| Comparative Example L | pectin (2)/arginine (0.5) | liquid |

EXAMPLE 19

This example illustrates the effects of the different diamines (other than basic amino acids) on the gelation characteristics of pectin/papaya latex papain mixture.

To 2 ml of 2% pectin solution (from Sigma Chemical Company, grade 1) was added 10 mg of 1-(3-aminopropyl) imidazole and 10 mg of papaya latex papain in 50 μl of deionized water. These components were mixed thoroughly and allowed to react at room temperature. A gel was formed after 2 hours.

To 2 ml of 2% pectin solution was added 10 mg of diethylenetriamine and 10 mg of crude papaya latex papain in 50 μl of deionized water. These components were mixed thoroughly and allowed to react at room temperature. A soft gel was formed after 4 hours.

To 2 ml of 2% pectin solution was added 10 mg of an amino-ether [poly(propylene glycol)-poly(ethylene glycol)-poly(propylene glycol)bis(2-aminopropyl ether)] and 10 mg of crude papaya latex papain in 50 μl of deionized water. These components were mixed thoroughly and allowed to react at room temperature. The viscosity of the reaction mixture was significantly increased after 2 hours.

EXAMPLE 20

This example illustrates the enhanced gelation properties of amino acid-modified pectin in the presence of calcium chloride.

8 mg of L-arginine and 8 mg of crude papaya latex papain in 50 μl of deionized water were added to 2 ml of 2% pectin solution (HM Type from Hercules). The mixture was mixed thoroughly and allowed to react at room temperature. A gel was formed after 1 hour. Deionized water (6 ml) was added, and the gel was dissolved by vortexing for a few minutes. To the 0.5% arginine-modified pectin solution was added 20 μl of 2 M $CaCl_2$ and the resulting solution was mixed thoroughly. A transparent gel was formed in 2–6 minutes.

Under the same pH condition, 1% of the untreated pectin and 1% low methoxy pectin did not form gels by the addition of 20 μl of 2 M $CaCl_2$.

10 mg of arginine modified pectin (isolated from Example 21) was dissolved in 2 ml of deionized water. To this pectin solution was added 10 μl of 2 M $CaCl_2$. The resulting solution was mixed thoroughly. A transparent gel was obtained in 5 minutes.

EXAMPLE 21

This example illustrates the enhanced gelling properties of amino acid-modified pectin in the presence of sucrose and citric acid.

20 mg of pectin (HM Type from Hercules), 6.4 g of sucrose were dissolved in 4 ml of deionized water. To the resulting solution was added 10 mg of L-arginine and 10 mg of papaya latex papain in 50 μl of deionized water. The mixture was mixed thoroughly and heated up to 60° C. for 5 min and then allowed it to cool to room temperature. After sitting at room temperature overnight, a gel was formed. Under the same reaction conditions, a mixture of 2 parts untreated pectin, 160 parts sucrose and 1 part citric acid did not form a gel.

EXAMPLE 22

This example illustrates the enhanced gelation properties of amino acid pectin catalyzed by the partially purified food grade papaya latex papain. To 2 ml of 2% pectin solution (Genu®BB slow set pectin, available from Hercules) was added 8 mg of L-arginine and 30 μl of LiquiPanol® T-100 (partially purified papaya latex papain, food grade, from Enzyme Development Corporation, New York, N.Y.). The mixture was vortexed for 30 seconds at 24° C. A gel was formed after 2 minutes.

EXAMPLE 23

This example illustrates the enhanced gelation properties of a sugar beet pectin after treatment with papaya latex papain and L-arginine. To 2 ml of 2% sugar beet pectin solution, available from Hercules Incorporated is added 10 mg of L-arginine and 10 mg of papaya latex papain in 100 μ of deionized water. The mixture was vortexed for 1 minute at 24° C. and allowed to react at room temperature. A soft gel formed after 15 minutes.

What is claimed is:

1. A composition comprising a modified pectin having the formula:

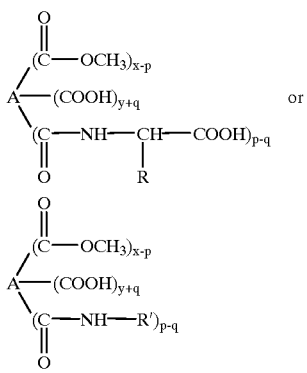

wherein x, y, p, q are in mole fractions, and
x=0.02 to 1.00,
y=1−x,
p=from above 0 to x,
q=from above 0 to p A is the residue after the —COOCH$_3$ and —COOH groups have been removed from pectin R is (CH$_2$)$_4$NH$_2$, (residue after NH$_2$CH COOH has been removed from lysine), (CH$_2$)$_3$NHC(NH$_2$)=NH, (residue after NH$_2$CH COOH has been removed from arginine), or CH$_3$, (residue after NH$_2$CH COOH has been removed from alanine)

R' is
—CH$_2$—(CH$_2$)$_5$—NH$_2$,
—CH$_2$—CH$_2$—NH—CH$_2$—CH$_2$—NH$_2$,
—CH$_2$—CH$_2$—CH$_2$-imidazole, or
—CH(CH$_3$)—CH$_2$—[O—CH(CH$_3$)—CH$_2$]$_i$—(O—CH$_2$—CH$_2$)$_j$—[O—CH$_2$—CH(CH$_3$)]$_k$—NH$_2$,
(wherein the sum of i, j, and k is from 3 to 12),
and a protease.

2. The composition of claim 1 wherein A is the residue after the —COOCH$_3$ and —COOH groups have been removed from pectin having a methoxy content of from about 2 to about 100% and a molecular weight of from about 15,000 to about 500,000.

3. The composition of claim 1 wherein

R is

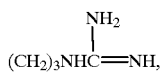

(residue after NH$_2$CHCOOH has been removed from arginine).

4. The composition of claim 2 wherein
R is

(residue after NH$_2$CHCOOH has been removed from arginine).

5. The composition of claim 4 wherein A is the residue after the —COOCH$_3$ and —COOH groups have been removed from pectin from having a methoxy content of from about 65 to about 90% and a molecular weight from about 25,000 to about 150,000.

6. The composition of claim 4 wherein
R is

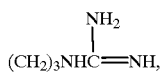

(residue after NH$_2$CHCOOH has been removed from arginine),
R' is
—CH$_2$—(CH$_2$)$_5$—NH$_2$,
—CH$_2$—CH$_2$—NH—CH$_2$—CH$_2$—NH$_2$, or
—CH$_2$—CH$_2$—CH$_2$-imidazole.

7. The composition of claim 5 wherein
R is

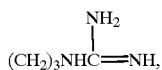

(residue after NH$_2$CHCOOH has been removed from arginine),
R' is
—CH$_2$—(CH$_2$)$_5$—NH$_2$,
—CH$_2$—CH$_2$—NH—CH$_2$—CH$_2$—NH$_2$, or
—CH$_2$—CH$_2$—CH$_2$-imidazole.

8. The composition of claim 1 wherein the protease comprises a papain.

9. The composition of claim 1 wherein the protease comprises a trypsin.

10. The composition of claim 8 wherein the papain comprises papaya latex papain.

11. The composition of claim 9 wherein the trypsin comprises bovine pancreas trypsin.

* * * * *